UNITED STATES PATENT OFFICE.

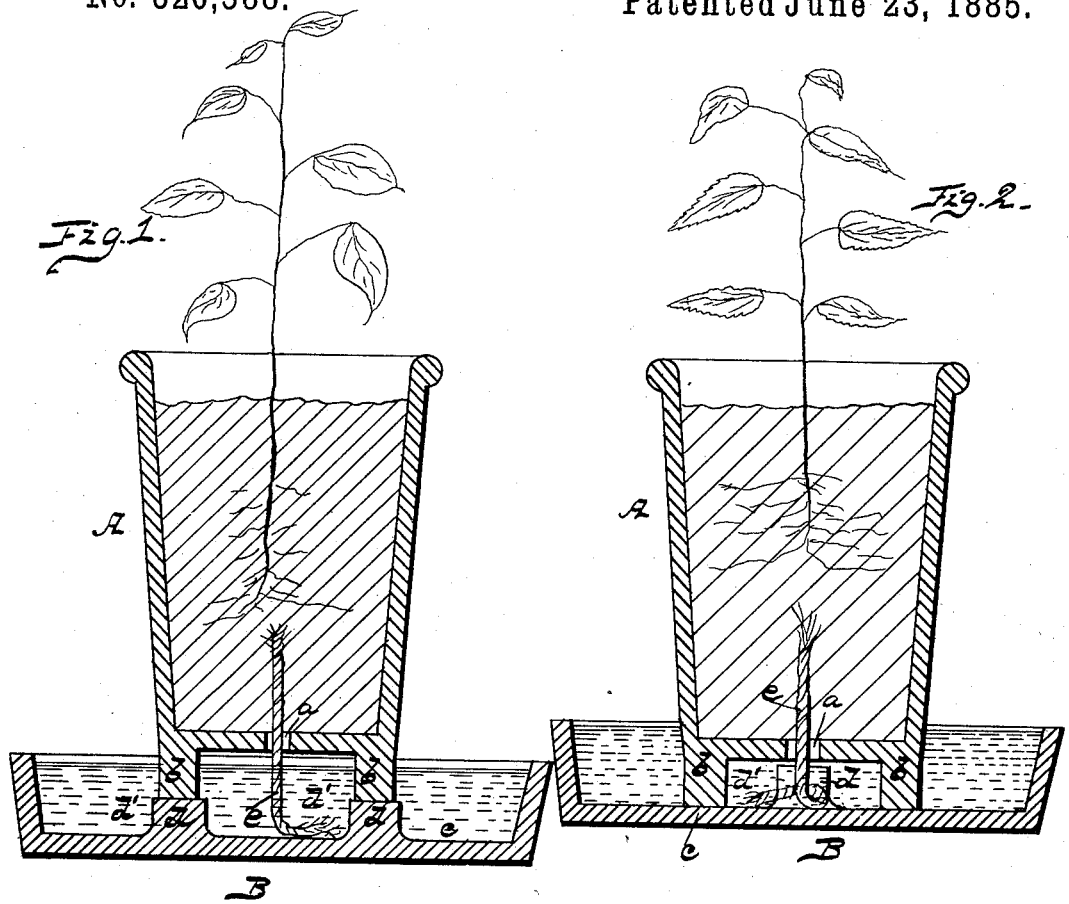

SOLOMON J. RHOADS, OF METROPOLIS, ILLINOIS.

FLOWER-POT.

SPECIFICATION forming part of Letters Patent No. 320,588, dated June 23, 1885.

Application filed March 30, 1885. (No model.)

*To all whom it may concern:*

Be it known that I, SOLOMON J. RHOADS, a citizen of the United States, residing at Metropolis, in the county of Massac and State of Illinois, have invented certain new and useful Improvements in Flower-Pots; and I do hereby declare the following to be a full, clear, and exact description of the invention, such as will enable others skilled in the art to which it appertains to make and use the same.

This invention has relation to improvements in flower-pots; and it consists in the construction and novel arrangement of devices hereinafter fully explained, and particularly pointed out in the appended claim.

The annexed drawings, to which reference is made, fully illustrate my invention, in which Figure 1 represents a vertical sectional view of my device, showing the pot elevated. Fig. 2 is a similar view showing the pot resting upon the base of the saucer.

Referring by letter to the accompanying drawings, A designates the flower-pot, having the central hole, $a$, in its base or bottom, and the under side of which is provided with feet or lugs $b$, upon which the pot is supported, thus elevating the bottom aforesaid.

B indicates the receptacle or saucer, having a solid bottom or base, $c$, and within said saucer lugs or projections are arranged, as shown at $d$, which are preferably about the size of the feet on the pot, and this saucer is designed to contain water, whereby the soil in the pot is kept moistened. For this purpose I provide a wick, $e$, of any suitable material, which is inserted in the opening of the bottom of the pot, the upper portion thereof entering the soil in said pot, and the lower portion submerged in the saucer.

It will be observed by reference to the annexed drawings and by the foregoing description that by the construction of the pot and saucer shown the flower-pot can be kept in the water while in the saucer by placing the projections or feet on said pot between the lugs on the saucer and in the spaces $d'$, between said latter lugs; and if desired to keep the pot out of the water, and at the same time get the advantage of the protection that the water in the saucer gives from admitting insects, &c., to the pot, the pot can be elevated, resting upon its feet upon the lugs in the saucer, and, by means of the wick, moisture can be supplied to the soil and be regulated to the degree desired by the nature of the plant contained in said pot.

Having described my invention, what I claim, and desire to secure by Letters Patent, is—

The combination, with the bowl A, having the feet made integral therewith, and a perforation in its bottom, and provided with the wick $e$, of the saucer B, provided with the upwardly-projecting lugs, made integral therewith, as described, and for the purpose specified.

In testimony whereof I affix my signature in presence of two witnesses.

SOLOMON J. RHOADS.

Witnesses:
DANIEL R. PRYOR,
EUGENE B. CROPPER.